Aug. 12, 1969 NOBUO MATSUMOTO ET AL 3,461,067
PROCESS FOR THE PURIFICATION OF SEWAGE PLANT EFFLUENT
Filed Aug. 21, 1967
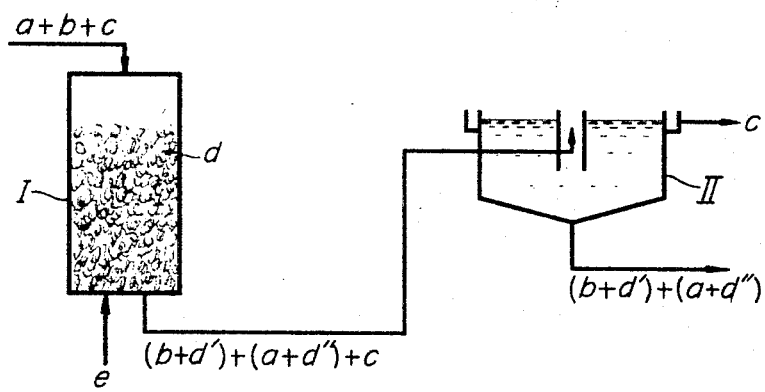
INVENTORS
Nobuo Matsumoto
Hidenobu Arimitsu
BY
ATTORNEY United States Patent Office 3,461,067
Patented Aug. 12, 1969

3,461,067
PROCESS FOR THE PURIFICATION OF
SEWAGE PLANT EFFLUENT
Nobuo Matsumoto and Hidenobu Arimitsu, Tokyo, Japan, assignors to Ebara-Infilco Kabushiki Kaisha, Tokyo, Japan, a corporation of Japan
Filed Aug. 21, 1967, Ser. No. 662,051
Claims priority, application Japan, Aug. 23, 1966, 41/55,001
Int. Cl. C02b 1/20
U.S. Cl. 210—47                                1 Claim

ABSTRACT OF THE DISCLOSURE

A process for the purification of effluent from sewage treatment, i.e., a sewage plant effluent, which comprises contacting the effluent with a metallic iron to convert coloring organic substances and phosphate ion, present in said effluent, into water-insoluble iron salts and removing said iron salts from the purification system, and which enables a purified water to be obtained with a stable degree of decolorization and a stable quality and will ease the subsequent softening of the same for use as industrial water.

Background of the invention

*Field of the invention.*—The present invention relates to a process for the purification of the so-called sewage plant effluent from a sewage treatment plant, which process comprises converting organic substances and phosphate ion, present in the effluent, into water-insoluble iron salts and removing said iron salts from the purification system.

*Description of the prior art.*—Sewage plant effluent usually contains organic compounds and phosphate ion therein. These organic compounds provide coloring sources in the effluent which are hard to remove, whereas the phosphate ion interferes with the formation and precipitation of calcium carbonate, thereby indirectly hampering the reaction in the process of softening the sewage plant effluent.

Therefore, when such sewage plant effluent is to be reused as industrial water, it is necessary to purify the effluent by subjecting it to some treatment but the fact is that these objectionable substances cannot simply be removed by the conventional coagulation and sedimentation treatment. In the regeneration of a sewage plant effluent into industrial water, it has heretofore been practiced to soften the effluent by adding thereto a suitable amount of sodium carbonate and slaked lime to remove calcium salts from the effluent in the form of calcium carbonates but, in this case, the presence of phosphate ion has been particularly objectionable due to the fact that it prevents the reaction between the calcium salts, and sodium carbonate and slaked lime, making it impossible to obtain a purified water with a stable quality.

Summary of the invention

The object of the present invention is to decolorize and stabilize the quality of sewage plant effluent, by removing organic substances and phosphate ion contained in the effluent therefrom upon conversion of the same into water-insoluble iron-organic substance complex salts and iron phosphate respectively.

According to the process of this invention, a sewage plant effluent is caused to contact with metallic iron to produce ferrous ion. The ferrous ion thus produced is combined with phosphate ion to form water-insoluble phosphate iron. The ferrous ion is also oxidized into ferric ion, which reacts with organic substances contained in the effluent, precipitating said organic substances in the form of water-insoluble solid complex salts of iron and the organic substances. In this case, a coagulant may be added as required for the coagulation of the water-insoluble substances. By removing the water-insoluble substances in the manner described, it is possible to obtain a limpid purified water having stabilized properties.

The metallic iron to be used in the present invention may, for example, be metal chips from a machine shop. Elution of the metallic iron and oxidation of the resultant ferrous ion are effected by the oxygen dissolved in the effluent or by air or chlorine injected into the effluent. Thus, according to the present invention, it is possible to remove organic substances and phosphate ion from a sewage plant effluent with much ease and economy which can hardly be removed by the conventional coagulation and sedimentation treatment, and thereby to effect decolorization as well as stabilization of the quality of the effluent smoothly, facilitating the subsequent softening process.

Brief description of the drawing

The drawing shows a process diagram illustrating the process of the present invention.

Description of the preferred embodiment

A preferred embodiment of the present invention will be described with reference to the accompanying drawing.

Referring to the drawing, a sewage plant effluent $a+b+c$, containing organic substances $a$ and phosphate ion $b$, is introduced into a filling tower I which is packed with metal chips from a machine shop, consisting principally of metallic iron $d$. Part of the metallic iron $d$ is dissolved in the effluent forming ferrous ion $d'$, which is readily combined with the phosphate ion $b$ forming water-insoluble phosphate iron $b+d'$. The ferrous ion $d'$ is also oxidized by the dissolved oxygen in the effluent into ferric ion $d''$, which immediately reacts with the organic substances $a$ to form complex salts of iron and the organic substances $a+d''$ which precipitate as water-insoluble solids. The elution of the metallic iron and formation of the ferric ion may be promoted by blowing air $e$ into the metallic iron-packed tower I. As a result of the series of reactions described, the sewage plant effluent is converted into a liquid containing the phosphate iron and complex salts of iron and the organic substances. The liquid is then led into a separation apparatus II wherein the flocking is further promoted, if necessary by introducing into the apparatus a small amount of coagulant, and the resultant flocks are removed from the liquid by settling or filtering the same. Thus, a limpid purified water $c$ having stable properties is obtained.

EXAMPLE 1

A sewage plant effluent having a color of 38 degrees and a turbidity of 46 degrees, and containing 21.2 p.p.m of COD and 3.60 p.p.m. of phosphate ion, was subjected to coagulation and sedimentation treatment in the con ventional manner, using alumina sulfate and ferric chloride separately. The results are shown in the table below:

COAGULATION AND SEDIMENTATION WITH ALUMINA SULFATE

| Amount used (p.p.m.) | pH of effluent | Turbidity (degree) | Color (degree) | COD (p.p.m.) | PO₄ (p.p.m.) | Mud (Percent by vol.) |
| --- | --- | --- | --- | --- | --- | --- |
| 30 | 7.4 | 3 | 14 | 8.1 | 0.46 | 0.7 |
| 60 | 7.1 | 1 | 11 | 6.7 | 0.19 | 1.4 |
| 90 | 6.9 | 1 | 10 | 6.6 | 0.10 | 1.8 |
| 120 | 6.7 | 1 | 10 | 6.2 | 0.07 | 2.3 |

COAGULATION AND SEDIMENTATION WITH FERRIC CHLORIDE

| Amount used (p.p.m.) | pH of effluent | Turbidity (degree) | Color (degree) | COD (p.p.m.) | PO₄ (p.p.m.) | Mud (Percent by vol.) |
| --- | --- | --- | --- | --- | --- | --- |
| 30 | 7.1 | 1 | 22 | 7.7 | 0.19 | 0.5 |
| 60 | 6.8 | Smaller than 1 | 15 | 6.5 | 0.10 | 0.9 |
| 90 | 6.5 | Smaller than 1 | 11 | 6.0 | <0.02 | 1.2 |
| 120 | 6.3 | Smaller than 1 | 8 | 5.6 | <0.02 | 1.6 |

EXAMPLE 2

A sewage plant effluent having the same composition as that in Example 1 was fed into a tower from the top thereof at the rate of 15 l./min., said tower being 0.5 m.² in cross sectional area and filled with wrought iron chips at a height of 1 m. The effluent obtained from the bottom of the tower was subjected to coagulation and sedimentation treatment by injecting therein 10 p.p.m. of alumina sulfate. A purified water of the following properties was obtained:

pH _____ 7.5.
Turbidity _____ Not greater than 1°.
Color _____ 5°.
COD _____ 5.4 p.p.m.
PO₄ _____ Not more than 0.02 p.p.m.
Mud (by vol.) _____ 1.1%.

EXAMPLE 3

A sewage plant effluent of the same composition as that in Example 1 was fed into a tower from the top thereof at the rate of 15 l./min., said tower being 0.5 m.² in cross sectional area and filled with wrought iron chips at a height of 1 m., while concurrently blowing air from the bottom of the tower at the rate of 1.5 l. (at NTP)/min. The effluent obtained from the bottom of the tower contained 20 p.p.m. of iron. Into this effluent was injected 0.1 p.p.m. of "Separan Ap–30," a high molecular coagulant, manufactured by Dow Chemical Company in the U.S.A., to grow the flocks, which were separated upon sedimentation. The water obtained had the following properties:

pH _____ 7.7.
Turbidity _____ Not greater than 1°.
Color _____ 3°.
COD _____ 4.6 p.p.m.
PO₄ _____ Not more than 0.02 p.p.m.
Mud (by vol.) _____ 1.4%.

We claim:
1. In the purification of sewage plant effluent from a sewage treatment plant which comprises converting organic substances and phosphate ion into water-insoluble iron salts, removing any iron salts from the effluent, and then softening the effluent by adding thereto a suitable amount of sodium carbonate and slaked lime to remove calcium salts in the form of calcium carbonate, the improvement comprising:

continuously feeding sewage plant effluent to the top of a tower containing wrought iron chips in a depth of at least one meter and concurrently continuously blowing air to the bottom of said tower through said chips and effluent, thereby converting organic substances and phosphate ion contained in said effluent into complex salts of iron and the organic compounds and of iron phosphate, respectively, by combination with iron ion from said metallic iron;

continuously removing the effluent containing iron phosphate and organic iron complex salts from the bottom of said tower;

adding a coagulant to said effluent containing iron salts; and separating said iron salts from said effluent by sedimentation prior to softening said effluent.

References Cited

UNITED STATES PATENTS

| 2,034,460 | 3/1936 | Darcey | 210—47 |
| 2,116,053 | 5/1938 | Urbain et al. | 210—47 X |
| 3,135,687 | 6/1964 | Jung et al. | 210—47 |
| 3,86,910 | 6/1968 | Forrest | 210—5 |

MICHAEL E. ROGERS, Primary Examiner

U.S. Cl. X.R.

23—105; 210—50, 53